(12) United States Patent
Yoshizawa et al.

(10) Patent No.: US 10,486,522 B2
(45) Date of Patent: Nov. 26, 2019

(54) HYBRID WORK VEHICLE AND HYBRID WORK VEHICLE CONTROL METHOD

(71) Applicant: Komatsu Ltd., Tokyo (JP)

(72) Inventors: Masao Yoshizawa, Tokyo (JP);
Shunsuke Miyamoto, Tokyo (JP);
Yasunori Ohkura, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 16/077,224

(22) PCT Filed: Mar. 24, 2017

(86) PCT No.: PCT/JP2017/012184
§ 371 (c)(1),
(2) Date: Aug. 10, 2018

(87) PCT Pub. No.: WO2017/170286
PCT Pub. Date: Oct. 5, 2017

(65) Prior Publication Data
US 2019/0031014 A1 Jan. 31, 2019

(30) Foreign Application Priority Data

Mar. 30, 2016 (JP) .................................. 2016-069586

(51) Int. Cl.
*B60K 6/445* (2007.10)
*B60K 6/54* (2007.10)
(Continued)

(52) U.S. Cl.
CPC ................ *B60K 6/445* (2013.01); *B60K 6/54* (2013.01); *B60L 15/20* (2013.01); *B60W 10/08* (2013.01); *B60W 20/17* (2016.01); *E02F 9/22* (2013.01)

(58) Field of Classification Search
CPC ......... B60W 20/17; B60W 10/08; E02F 9/22; B60K 6/445; B60K 6/54; B60L 11/14; B60L 15/20
See application file for complete search history.

(56) References Cited

U.S. PATENT DOCUMENTS

| | | | |
|---|---|---|---|
| 9,446,669 B2 | 9/2016 | Nakabayashi et al. | |
| 2004/0162187 A1* | 8/2004 | Suzuki | B60K 6/44 477/182 |

(Continued)

FOREIGN PATENT DOCUMENTS

| | | |
|---|---|---|
| EP | 2955282 A1 | 12/2015 |
| JP | 6702034 B1 | 4/2015 |

(Continued)

OTHER PUBLICATIONS

Supplementary European Search Report dated Jun. 28, 2019, issued in the corresponding European Patent Application No. 17774823.3, (6 pages).

(Continued)

*Primary Examiner* — Mark J Beauchaine
(74) *Attorney, Agent, or Firm* — Locke Lord LLP

(57) ABSTRACT

A hybrid work vehicle includes a traveling device and a control device. The traveling device includes first and second rotary electric machines, an internal-combustion engine, a power transmission device transmitting power output from the engine to a vehicle wheel through at least the first and second machines, a third rotary electric machine applying power to at least one of the first and second machines, and a braking device braking the vehicle wheel. The control device executes a first control of applying the power of the third machine to at least one of the first and second machines and a second control of canceling the first control when a vehicle speed of the traveling device becomes or exceeds a speed threshold value and continuously applies the power (Continued)

from the third machine when a braking force of the braking device is larger than a braking force threshold value during the second control.

7 Claims, 10 Drawing Sheets

(51) Int. Cl.
*B60L 15/20* (2006.01)
*B60W 10/08* (2006.01)
*B60W 20/17* (2016.01)
*E02F 9/22* (2006.01)

(56) References Cited

U.S. PATENT DOCUMENTS

| | | |
|---|---|---|
| 2015/0367851 A1 | 12/2015 | Yoshizawa et al. |
| 2016/0024754 A1 | 1/2016 | Miyamoto et al. |
| 2016/0082950 A1 | 3/2016 | Monden et al. |
| 2016/0144720 A1 | 5/2016 | Nakabayashi et al. |

FOREIGN PATENT DOCUMENTS

| | | |
|---|---|---|
| JP | 2015-117716 A | 6/2015 |
| WO | 2015/068861 A1 | 5/2015 |
| WO | 2015/072484 A1 | 5/2015 |

OTHER PUBLICATIONS

International Search Report dated May 23, 2017, issued for PCT/JP2017/012184, (2 pages).

\* cited by examiner

HYBRID WORK VEHICLE AND HYBRID WORK VEHICLE CONTROL METHOD

FIELD

The present invention relates to a hybrid work vehicle having a power source obtained by the combination of an internal-combustion engine and a rotary electric machine and a hybrid work vehicle control method.

BACKGROUND

A hybrid work vehicle is a work vehicle which has a power source obtained by the combination of an internal-combustion engine and a rotary electric machine. Patent Literature 1 discloses a technique of easily preventing an excessive rotation of a motor due to a backward movement of a hybrid work vehicle.

CITATION LIST

Patent Literature

Patent Literature 1: WO 2015/068861 A

SUMMARY

Technical Problem

The technique disclosed in Patent Literature 1 prevents the excessive rotation of the motor due to the backward movement of the hybrid work vehicle by increasing a traction force by the assistance of an auxiliary motor. In the technique disclosed in Patent Literature 1, since the hybrid work vehicle stops if an operator operates a braking device when the hybrid work vehicle moves backward, the assistance of the auxiliary motor is canceled. Then, since it is determined that the hybrid work vehicle has moved backward due to backlash, twisting, and the like of components constituting a drive system of the hybrid work vehicle, the assistance of the auxiliary motor is started. As a result, since the assistance of the auxiliary motor is repeatedly started and canceled, there is a possibility that the hybrid work vehicle may be vibrated.

An object of an aspect of the invention is to suppress vibration generated in a hybrid work vehicle when a braking force is generated at the time of increasing a traction force of the hybrid vehicle.

Solution to Problem

According to a first aspect of the present invention, a hybrid work vehicle comprises: a traveling device which drives a vehicle wheel so that a vehicle body travels; and a control device which controls the traveling device, wherein the traveling device includes a first rotary electric machine, a second rotary electric machine, an internal-combustion engine, a power transmission device which transmits power output from the internal-combustion engine to the vehicle wheel through at least the first rotary electric machine and the second rotary electric machine, a third rotary electric machine which applies power to at least one of the first rotary electric machine and the second rotary electric machine, and a braking device which brakes the vehicle wheel, and wherein the control device executes a first control of applying the power of the third rotary electric machine to at least one of the first rotary electric machine and the second rotary electric machine and a second control of canceling the first control when a vehicle speed of the traveling device becomes or exceeds a speed threshold value and continuously applies the power from the third rotary electric machine when a braking force of the braking device is larger than a braking force threshold value during the second control.

According to a second aspect of the present invention, a hybrid work vehicle control method of controlling a hybrid work vehicle including an internal-combustion engine and a power transmission device which includes a third rotary electric machine applying power to at least one of a first rotary electric machine and a second rotary electric machine and outputs the power output from the internal-combustion engine to a traveling device through at least the first rotary electric machine and the second rotary electric machine, the hybrid work vehicle control method comprises: executing a first control of applying the power of the third rotary electric machine to at least one of the first rotary electric machine and the second rotary electric machine and a second control of canceling the first control when a vehicle speed of the hybrid work vehicle becomes or exceeds a speed threshold value; and continuously applying the power from the third rotary electric machine during the second control based on braking information representing a braking state of the hybrid work vehicle.

According to an aspect of the invention, it is possible to suppress the vibration generated in the hybrid work vehicle when the braking force is generated at the time of increasing the traction force of the hybrid vehicle.

DESCRIPTION OF EMBODIMENTS

A mode for carrying out the invention (an embodiment) will be described in detail with reference to the drawings.

<Hybrid Work Vehicle>

Figure 1:
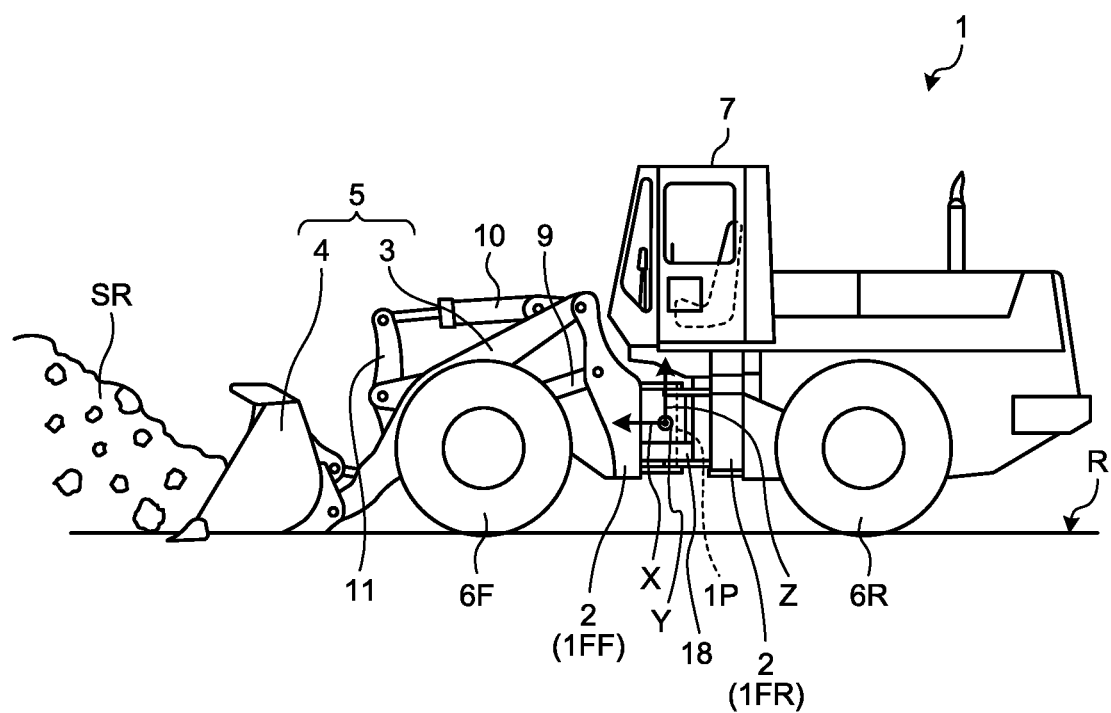
FIG. 1 is a diagram illustrating a hybrid work vehicle according to an embodiment.

FIG. 1 is a diagram illustrating a hybrid work vehicle according to an embodiment. In the embodiment, as the hybrid work vehicle, a wheel loader 1 for loading crushed stones or sands or rocks produced at the time of excavating crushed stones onto, for example, a transportation vehicle such as a dump truck is exemplified. The wheel loader 1 is a hybrid type work vehicle which travels by using an internal-combustion engine and a rotary electric machine as a power source.

The wheel loader 1 includes a vehicle body 2, a working equipment 5 with a boom 3 and a bucket 4, front and rear wheels 6F and 6R, a cab 7, a boom cylinder 9 corresponding to an actuator, and a bucket cylinder 10 corresponding to an actuator. The vehicle body 2 includes a front frame 1FF and a rear frame 1FR. The front frame 1FF and the rear frame 1FR are connected to each other by a pin 1P and are bent about the pin 1P. A steering cylinder 18 is attached between the front frame 1FF and the rear frame 1FR.

The working equipment 5, the front and rear wheels 6F and 6R, and the cab 7 are attached to the vehicle body 2. Specifically, the front frame 1FF includes the front wheel 6F and the rear frame 1FR includes the rear wheel 6R. In a case in which the front wheel 6F moves straightly forward, a direction from the cab 7 to the working equipment 5 will be referred to as a front side and a direction from the working equipment 5 to the cab 7 will be referred to as a rear side. The left and right sides of the wheel loader 1 are set based on the front side.

The front and rear wheels 6F and 6R contact a road surface R. In the embodiment, the ground contact surface side of the front and rear wheels 6F and 6R will be referred to as the lower side and a direction moving away from the ground contact surfaces of the front and rear wheels 6F and 6R will be referred to as the upper side. When the front and rear wheels 6F and 6R rotate, the wheel loader 1 travels. The steering of the wheel loader 1 is realized when the vehicle body 2 is bent between the front and rear wheels 6F and 6R.

In the embodiment, on the assumption that the gravity center of the wheel loader 1 is set as an origin, an axis passing through the origin and parallel to the front and rear direction of the wheel loader 1 will be referred to as an X axis, an axis passing through the origin and parallel to the left and right direction of the wheel loader 1 will be referred to as a Y axis, and an axis orthogonal to the X axis and the Y axis will be referred to as a Z axis.

The working equipment 5 is disposed at a front part of the vehicle body 2. The boom 3 is attached to the front side of the vehicle body 2 to be operable and extends forward. One end side of the boom cylinder 9 is attached to the vehicle body 2 and the other end side thereof is attached to the boom 3. The boom 3 is supported by the vehicle body 2 and is operated by the boom cylinder 9. When the bucket 4 raises crushed stones or the like, a target is excavated. Sands or crushed stones which are raised by the bucket 4 will be appropriately referred to as an excavated material SR. The bucket 4 rotates while being supported by the opposite side to the vehicle body 2 in the boom 3, that is, the side away from the vehicle body 2.

One end portion of the bucket cylinder 10 is attached to and supported by the vehicle body 2 and the other end portion thereof is attached to one end portion of a bell crank 11. The other end portion of the bell crank 11 is connected to the bucket 4. A part of the bell crank 11 is attached to the boom 3 to be operable. The bucket 4 is connected to the boom 3 to be operable and rotates about a portion attached to the boom 3 when the bucket cylinder 10 is lengthened or shortened. A device for rotating the bucket 4 is not limited to the bucket cylinder 10.

Figure 2:
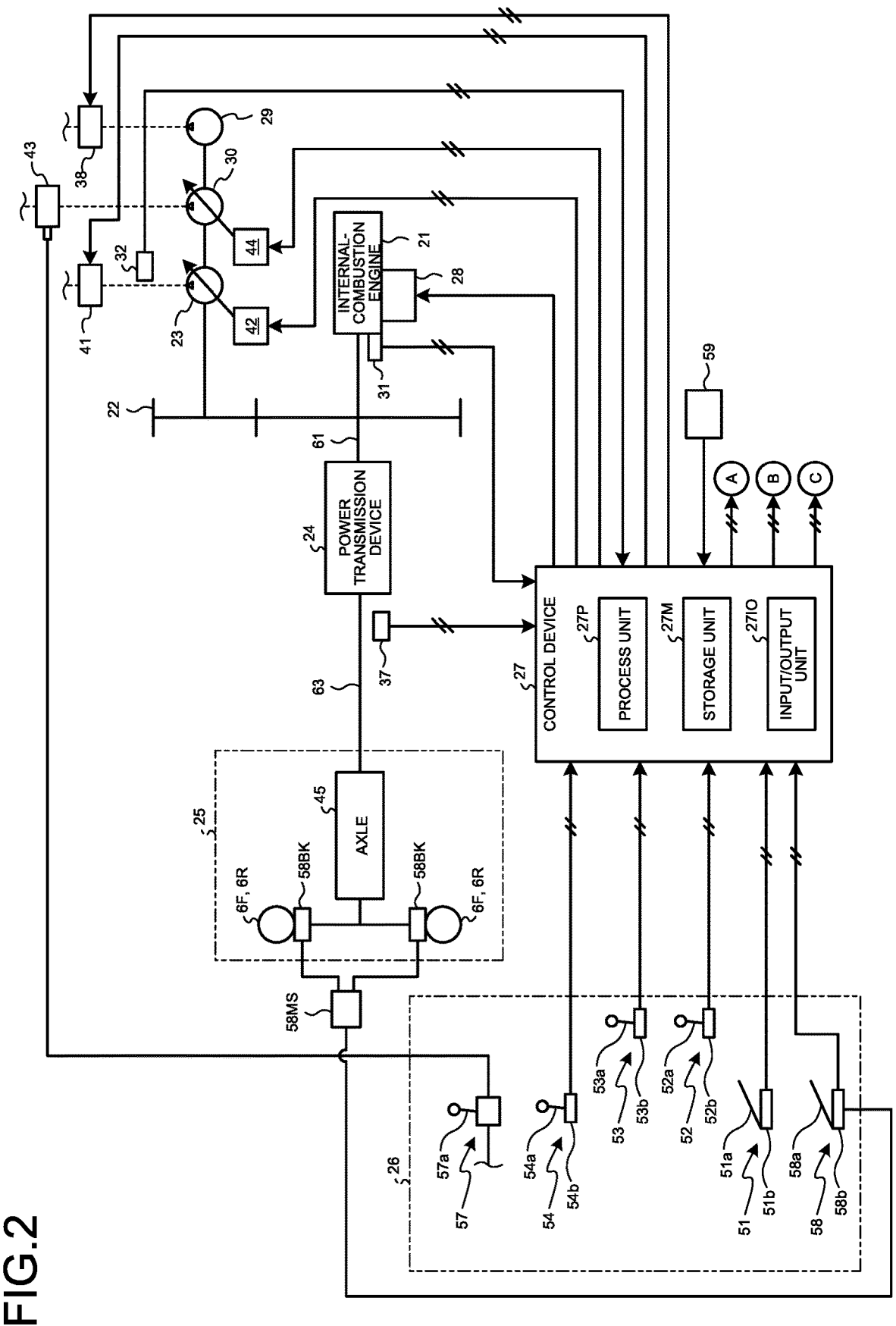
FIG. 2 is a diagram illustrating a control system, an operation system, a hydraulic system, and a drive system of a wheel loader.

FIG. 2 is a diagram illustrating a control system, an operation system, a hydraulic system, and a drive system of the wheel loader 1. As illustrated in FIG. 2, the wheel loader 1 includes an internal-combustion engine 21, a power transmission device 24, a traveling device 25, an operation device 26, and a control device 27.

The internal-combustion engine 21 is, for example, a diesel engine. An output of the internal-combustion engine 21 is adjusted by controlling an injection amount of a fuel injection device 28 attached to the internal-combustion engine 21. The wheel loader 1 includes a rotation speed detector 31. The rotation speed detector 31 detects a rotation speed of the internal-combustion engine 21 and transmits a detection signal representing the rotation speed to the control device 27.

A power take off (PTO) 22 is connected to the internal-combustion engine 21 and divides the driving power from the internal-combustion engine 21. The PTO 22 transmits the driving power of the internal-combustion engine 21 to the hydraulic pump and the power transmission device 24.

The wheel loader 1 includes a working equipment pump 23, a steering pump 30, and a transmission pump 29. In the embodiment, these pumps are hydraulic pumps. The working equipment pump 23 and the steering pump 30 are, for example, swash plate type variable displacement hydraulic pumps. Each hydraulic pump is not limited to the variable displacement pump. The transmission pump 29 is a fixed displacement hydraulic pump, but the invention is not limited thereto.

The working equipment pump 23 is driven by the power of the internal-combustion engine 21. A hydraulic oil discharged from the working equipment pump 23 is supplied to the boom cylinder 9 and the bucket cylinder 10 through a working equipment control valve 41. The wheel loader 1 includes a working equipment hydraulic pressure detector 32. The working equipment hydraulic pressure detector 32 detects a pressure (a hydraulic pressure) of the hydraulic oil discharged from the working equipment pump 23 and transmits a detection signal to the control device 27.

A first capacity control device 42 is connected to the working equipment pump 23. The first capacity control device 42 changes a discharge amount of the working equipment pump 23 by the control device 27. With such a mechanism, the discharge amount of the working equipment pump 23 is controlled by the control device 27.

The steering pump 30 is driven by the power of the internal-combustion engine 21. A hydraulic oil discharged from the steering pump 30 is supplied to the steering cylinder 18 through a steering control valve 43. A second capacity control device 44 is connected to the steering pump 30. The second capacity control device 44 is controlled by the control device 27 to change and control the tilt angle of the steering pump 30.

The transmission pump 29 is driven by the power generated by the internal-combustion engine 21. A hydraulic oil discharged from the transmission pump 29 is supplied to clutches CF, CR, CL, CH, Cm1, and Cm2 of the power transmission device 24 through a clutch control valve 38. The power transmission device 24 transmits the power generated by the internal-combustion engine 21 to the traveling device 25. The power transmission device 24 shifts and outputs the power generated by the internal-combustion engine 21.

The traveling device 25 includes an axle 45, the front and rear wheels 6F and 6R which are vehicle wheels, and a braking device 58BK. The axle 45 transmits the power from the power transmission device 24 to the front and rear wheels 6F and 6R. The front and rear wheels 6F and 6R rotate by the power transmitted from the power transmission device 24 so that the wheel loader 1 travels. In this way, in the embodiment, both the front and rear wheels 6F and 6R become the drive wheels of the wheel loader 1. The braking device 58BK generates the braking force by the pressure of the brake oil supplied from a hydraulic pressure generation device 58MS to brake the front and rear wheels 6F and 6R.

The wheel loader 1 includes a vehicle speed detector 37. The vehicle speed detector 37 detects a rotation speed (hereinafter, appropriately referred to as an output rotation speed) of an output shaft 63 of the power transmission device 24. Since the output rotation speed corresponds to the speed of the wheel loader 1, that is, the vehicle speed, the vehicle speed detector 37 detects the vehicle speed of the wheel loader 1 by detecting the output rotation speed. The vehicle speed of the wheel loader 1 is the same as the vehicle speed of the traveling device 25.

The vehicle speed detector 37 detects a rotation direction of the output shaft 63. Since the rotation direction of the output shaft 63 corresponds to the traveling direction of the wheel loader 1, the vehicle speed detector 37 serves as a traveling direction detector which detects the traveling direction of the wheel loader 1 by detecting the rotation direction of the output shaft 63. The vehicle speed detector 37 transmits a detection signal representing the output rotation speed and the rotation direction to the control device 27.

The wheel loader 1 includes an inclination detector 59. The inclination detector 59 detects the inclination of the wheel loader 1 with respect to the horizontal plane. An inclination of the wheel loader 1 with respect to the horizontal plane is, for example, an inclination of the X axis with respect to the horizontal plane and an inclination of the Y axis with respect to the horizontal plane illustrated in FIG. 1. The horizontal plane is a plane orthogonal to the gravity action direction, that is, the vertical direction. The inclination detector 59 transmits a detection signal representing an inclination angle which is an inclination of the wheel loader 1 with respect to the horizontal plane to the control device 27. An inclination angle sensor or an acceleration sensor is used as the inclination detector 59, but the invention is not limited thereto.

The operation device 26 is operated by an operator. The operation device 26 includes an accelerator operation device 51, a working equipment operation device 52, a shift operation device 53, a forward/backward movement operation device 54, a steering operation device 57, and a brake operation device 58.

The accelerator operation device 51 includes an accelerator operation member 51a and an accelerator operation detector 51b. The accelerator operation member 51a is a member that is operated to set the output of the internal-combustion engine 21 and the generator motor. The accelerator operation detector 51b detects the operation amount (hereinafter, appropriately referred to as an accelerator operation amount) of the accelerator operation member 51a. The accelerator operation detector 51b transmits a detection signal representing the accelerator operation amount to the control device 27.

The working equipment operation device 52 includes a working equipment operation member 52a and a working equipment operation detector 52b. The working equipment operation member 52a is a member that is operated to operate the working equipment 5. The working equipment operation detector 52b detects the position of the working equipment operation member 52a. The working equipment operation detector 52b outputs a detection signal representing the position of the working equipment operation member 52a to the control device 27. The working equipment operation detector 52b detects the operation amount of the working equipment operation member 52a by detecting the position of the working equipment operation member 52a.

The shift operation device 53 includes a shift operation member 53a and a shift operation detector 53b. The shift operation member 53a is a member that is used to select a speed range for defining the upper limit of the vehicle speed. The operator can select the speed range of the power transmission device 24 by operating the shift operation member 53a. The shift operation detector 53b detects the position of the shift operation member 53a. The position of the shift operation member 53a corresponds to, for example, a plurality of speed ranges including a first speed or a second speed. The shift operation detector 53b outputs a detection signal representing the position of the shift operation member 53a to the control device 27.

The forward/backward movement operation device 54 includes a forward/backward movement operation member 54a and a forward/backward movement position detector 54b. The operator can switch the forward movement and the backward movement of the wheel loader 1 by operating the forward/backward movement operation member 54a. The forward/backward movement operation member 54a is selectively changed to a forward position (F), a neutral position (N), and a reverse position (R). The forward/backward movement position detector 54b detects a position of the forward/backward movement operation member 54a. The forward/backward movement position detector 54b outputs a detection signal representing the position of the forward/backward movement operation member 54a to the control device 27.

The steering operation device 57 includes a steering operation member 57a. The steering operation device 57 supplies a pilot hydraulic pressure to the steering control valve 43 based on the operation of the steering operation member 57a. The steering control valve 43 is driven by the pilot hydraulic pressure supplied from the steering operation device 57. The steering operation device 57 may operate the steering control valve 43 by converting the operation of the steering operation member 57a into an electric signal. The operator can change the traveling direction of the wheel loader 1 to the left or right by operating the steering operation member 57a.

The brake operation device 58 includes a brake operation member 58a and a brake operation detector 58b. When the brake operation member 58a is operated, the brake operation device 58 supplies a brake oil of a pressure corresponding to the operation amount of the brake operation member 58a to the braking device 58BK from the hydraulic pressure generation device 58MS. The braking device 58BK generates a braking force corresponding to the operation amount of the brake operation member 58a by the pressure of the brake oil supplied from the hydraulic pressure generation device 58MS. The operator can operate the braking force of the traveling device 25 of the wheel loader 1 by operating the brake operation member 58a. The brake operation detector 58b detects the pressure (hereinafter, appropriately referred to as a braking pressure) of the brake oil and outputs a detection signal representing the braking pressure to the control device 27. The detection signal detected by the brake operation detector 58b is information representing the operation state of the braking device 58BK, that is, the braking state of the wheel loader 1. This information will be referred to as braking information.

The control device 27 includes a process unit 27P which is a processor such as a central processing unit (CPU), a storage unit 27M which is a memory such as a random access memory (RAM) and a read only memory (ROM), an input/output unit 2710, and a process unit 27P. The control device 27 controls the operation of the wheel loader 1. Further, the control device 27 executes the hybrid work vehicle control method according to the embodiment. The storage unit 27M stores a computer program and data for controlling the wheel loader 1. Further, the storage unit 27M stores a computer program and data for executing the hybrid work vehicle control method according to the embodiment. The input/output unit 2710 is an interface circuit to which various detectors and electronic devices of the wheel loader 1 are connected. The process unit 27P executes various controls to be described later.

The control device 27 transmits an instruction signal representing an instruction throttle value to the fuel injection device 28 to obtain a target rotation speed of the internal-combustion engine 21 corresponding to the accelerator operation amount. The control device 27 supplies the hydraulic oil to the boom cylinder 9 and the bucket cylinder 10 by controlling the working equipment control valve 41 based on the detection signal from the working equipment operation detector 52b. The boom cylinder 9 and the bucket cylinder 10 are lengthened or shortened when the hydraulic oil is supplied thereto. When the boom cylinder 9 and the bucket cylinder 10 are lengthened or shortened, the working equipment 5 is operated. The control device 27 controls the power transmission device 24 based on the detection signal output from each detector.

<Power Transmission Device 24>

Figure 3:
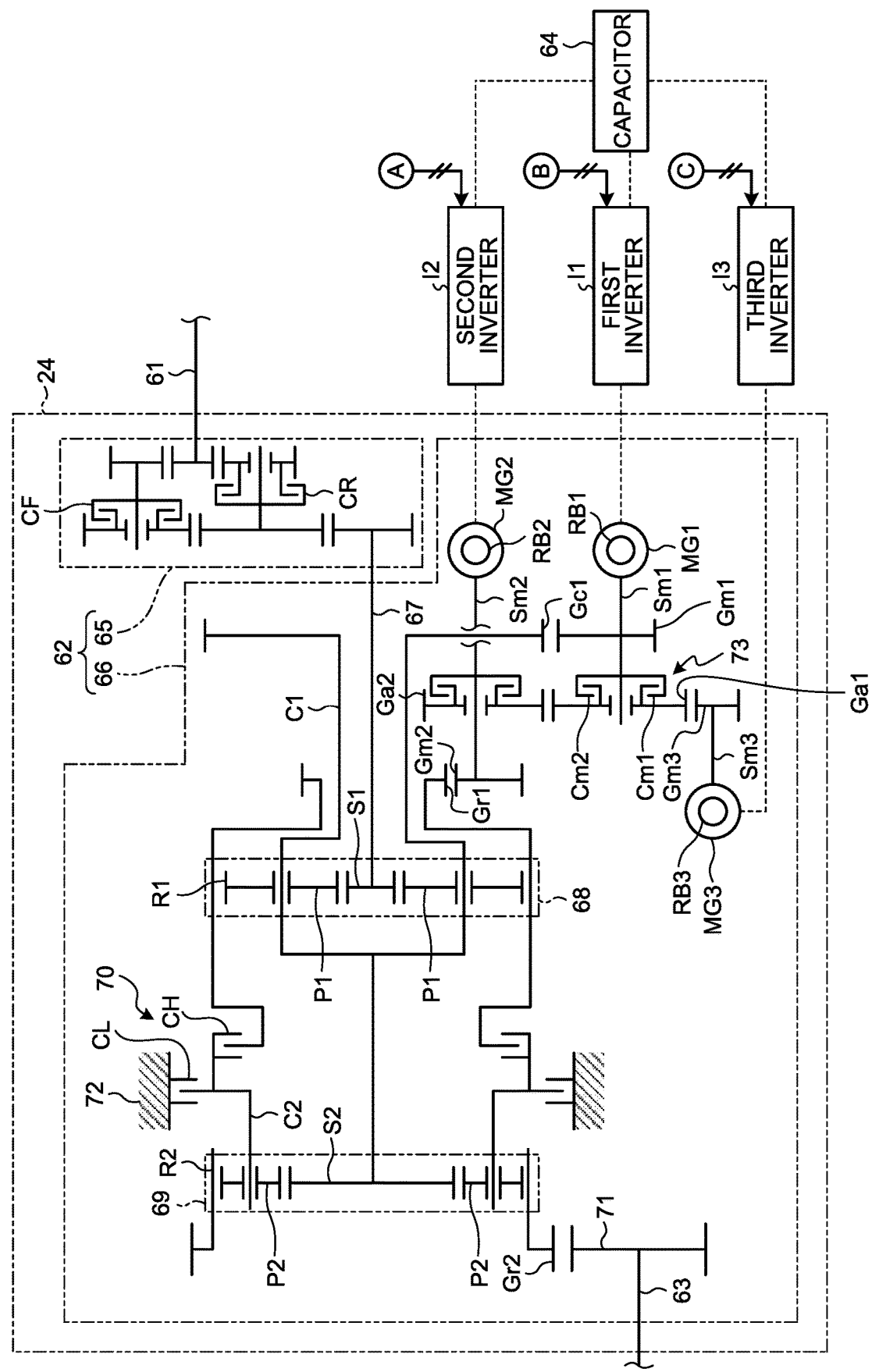
FIG. 3 is a schematic diagram illustrating a power transmission device.

FIG. 3 is a schematic diagram illustrating the power transmission device 24. As illustrated in FIG. 3, the power transmission device 24 includes an input shaft 61, a gear mechanism 62, an output shaft 63, a first rotary electric machine MG1, a second rotary electric machine MG2, a third rotary electric machine MG3, and a capacitor 64. The power transmission device 24 transmits the power output from the internal-combustion engine 21 to the vehicle wheels, that is, the front and rear wheels 6F and 6R which are the drive wheels through the first rotary electric machine MG1 and the second rotary electric machine MG2.

The input shaft 61 is connected to the PTO 22 illustrated in FIG. 2. The power of the internal-combustion engine 21 is input to the input shaft 61 through the PTO 22. The gear mechanism 62 transmits the rotation of the input shaft 61 to the output shaft 63. The output shaft 63 is connected to the traveling device 25 illustrated in FIG. 2 and transmits the power output from the gear mechanism 62 to the traveling device 25.

The gear mechanism 62 is a mechanism which transmits the driving power from the internal-combustion engine 21. The gear mechanism 62 changes the rotation speed ratio of the output shaft 63 with respect to the input shaft 61 in response to a change in the rotation speed of each of the first rotary electric machine MG1, the second rotary electric machine MG2, and the third rotary electric machine MG3. The gear mechanism 62 includes a forward and backward switching mechanism 65 and a transmission mechanism 66.

The forward and backward switching mechanism 65 includes a forward movement clutch CF, a backward movement clutch CR, and a transmission shaft 67. As the connection/disconnection of the forward movement clutch CF and the connection/disconnection of the backward movement clutch CR are switched, the rotation direction of the output shaft of the forward and backward switching mechanism 65 is changed. As a result, since the rotation direction of the transmission shaft 67 is changed, the traveling direction of the wheel loader 1 is changed. In the embodiment, the clutches CF, CR, CL, CH, Cm1, and Cm2 including the forward movement clutch CF and the backward movement clutch CR are hydraulic clutches. The hydraulic oil discharged from the transmission pump 29 is supplied to each clutch. The clutch control valve 38 illustrated in FIG. 2 supplies the hydraulic oil to each clutch or discharges the hydraulic oil from each clutch. The control device 27 controls the clutch control valve 38.

The transmission mechanism 66 includes first and second planetary gear mechanisms 68 and 69 which are planetary gear mechanisms, a speed switching mechanism 70, and an output gear 71. The first planetary gear mechanism 68 includes a first sun gear S1 which is a first component, a plurality of first planetary gears P1, a first carrier C1 which is a second component for supporting the plurality of first planetary gears P1, and a first ring gear R1 which is a third component. The first sun gear S1 is connected to the transmission shaft 67. The plurality of first planetary gears P1 mesh with the first sun gear S1 and are supported by the first carrier C1 to be rotatable. The first carrier C1 is connected to the first carrier gear Gc1. The first ring gear R1 meshes with the plurality of first planetary gears P1 and rotates. The outer circumference of the first ring gear R1 is provided with a first ring outer circumferential gear Gr1.

The second planetary gear mechanism 69 includes a second sun gear S2, a plurality of second planetary gears P2, a second carrier C2 supporting the plurality of second planetary gears P2, and a second ring gear R2. The second sun gear S2 is connected to the first carrier C1. The plurality of second planetary gears P2 mesh with the second sun gear S2 and are supported by the second carrier C2 to be rotatable. The second ring gear R2 meshes with the plurality of planetary gears P2 and rotate. The outer circumference of the second ring gear R2 is provided with the second ring outer circumferential gear Gr2. The second ring outer circumferential gear Gr2 meshes with the output gear 71. The rotation of the second ring gear R2 is output to the output shaft 63 through the output gear 71.

The speed switching mechanism 70 is a mechanism for switching the driving power transmission path of the power transmission device 24 to a high-speed mode in which the vehicle speed is relatively high and a low-speed mode in which the vehicle speed is relatively low. The speed switching mechanism 70 includes a high-speed clutch CH which is connected in the high-speed mode and a low-speed clutch CL which is connected in the low-speed mode. The high-speed clutch CH connects the first ring gear R1 and the second carrier C2 to each other or disconnects them from each other. The low-speed clutch CL stops or allows the rotation of the second carrier C2 by connecting the second carrier C2 and a fixed end 72 to each other or disconnecting them from each other.

The first rotary electric machine MG1 and the second rotary electric machine MG2 generate power by the electric energy. Further, the first rotary electric machine MG1 and the second rotary electric machine MG2 generate electric power by using the input power. When an instruction signal is transmitted from the control device 27 so that a torque is applied to the first rotary electric machine MG1 and the second rotary electric machine MG2 in a direction opposite to the rotation direction, the first rotary electric machine MG1 and the second rotary electric machine MG2 generate electric power. The rotation speed of the first rotary electric machine MG1 is detected by a first rotation speed detector RB1 and the rotation speed of the second rotary electric machine MG2 is detected by a second rotation speed detector RB2.

The first rotary electric machine gear Gm1 is fixed to the rotation shaft Sm1 of the first rotary electric machine MG1. The first rotary electric machine gear Gm1 meshes with the first carrier gear Gc1. The second rotary electric machine MG2 has the same structure as that of the first rotary electric machine MG1. The second rotary electric machine gear Gm2 is fixed to the rotation shaft Sm2 of the second rotary electric machine MG2. The second rotary electric machine gear Gm2 meshes with the first ring outer circumferential gear Gr1.

With such a structure, the first rotary electric machine MG1 exchanges power with the first carrier C1 which is the carrier of the first planetary gear mechanism 68. The second rotary electric machine MG2 exchanges power with the first ring gear R1 which is the ring gear of the first planetary gear mechanism 68. The internal-combustion engine 21 exchanges power with the first sun gear S1 which is the sun gear of the first planetary gear mechanism 68.

The third rotary electric machine MG3 assists at least one of the first rotary electric machine MG1 and the second rotary electric machine MG2. Specifically, the third rotary electric machine MG3 applies the power to at least one of the first rotary electric machine MG1 and the second rotary electric machine MG2. The third rotary electric machine MG3 has the same structure as those of the first rotary electric machine MG1 and the second rotary electric machine MG2. The rotation speed of the third rotary electric machine MG3 is detected by a third rotation speed detector RB3. In the embodiment, the third rotary electric machine MG3 assists a rotary electric machine having a low rotation speed between the first rotary electric machine MG1 and the second rotary electric machine MG2, but the assistance of the third rotary electric machine MG3 is not limited thereto.

In the embodiment, an AC synchronous motor, an SRM (Switched Reluctance Motor), an induction motor, or the like is used as the first rotary electric machine MG1, the second rotary electric machine MG2, and the third rotary electric machine MG3, but the invention is not limited thereto. In the embodiment, for example, a resolver is used as the first rotation speed detector RB1, the second rotation speed detector RB2, and the third rotation speed detector RB3, but the invention is not limited thereto.

The transmission mechanism 66 includes a rotary electric machine switching mechanism 73. The rotary electric machine switching mechanism 73 selectively switches an assistance target of the third rotary electric machine MG3 to the first rotary electric machine MG1 and the second rotary electric machine MG2. Specifically, the rotary electric machine switching mechanism 73 includes the first rotary electric machine clutch Cm1 which is a first power connection/disconnection mechanism, the second rotary electric machine clutch Cm2 which is a second power connection/disconnection mechanism, a first connection gear Ga1, and a second connection gear Ga2. The third rotary electric machine gear Gm3 is connected to a rotation shaft Sm3 of the third rotary electric machine MG3. The third rotary electric machine gear Gm3 meshes with the first connection gear Ga1.

The first rotary electric machine clutch Cm1 is disposed between the third rotary electric machine MG3 and the first rotary electric machine MG1. The first rotary electric machine clutch Cm1 switches the connection/disconnection between the rotation shaft Sm1 of the first rotary electric machine MG1 and the first connection gear Ga1. The first connection gear Ga1 meshes with the second connection gear Ga2. The second rotary electric machine clutch Cm2 is disposed between the third rotary electric machine MG3 and the second rotary electric machine MG2. The second rotary electric machine clutch Cm2 switches the connection/disconnection between the rotation shaft Sm2 of the second rotary electric machine MG2 and the second connection gear Ga2.

The rotary electric machine switching mechanism 73 can switch the third rotary electric machine MG3 among a first connection state, a second connection state, and a disconnection state. The first connection state is a state in which the first rotary electric machine clutch Cm1 is connected and the second rotary electric machine clutch Cm2 is disconnected. That is, the third rotary electric machine MG3 is connected to the first rotary electric machine MG1 in the first connection state. In the first connection state, the third rotary electric machine MG3 assists the first rotary electric machine MG1 by applying the power to the first rotary electric machine MG1.

The second connection state is a state in which the second rotary electric machine clutch Cm2 is connected and the first rotary electric machine clutch Cm1 is disconnected. That is, in the second connection state, the third rotary electric machine MG3 is connected to the second rotary electric machine MG2. In the second connection state, the third rotary electric machine MG3 assists the second rotary electric machine MG2 by applying the power to the second rotary electric machine MG2.

The disconnection state is a state in which both the first rotary electric machine clutch Cm1 and the second rotary electric machine clutch Cm2 are disconnected. That is, in the disconnection state, the third rotary electric machine MG3 is disconnected from any one of the first rotary electric machine MG1 and the second rotary electric machine MG2 so that the power is not applied to any one of the first rotary electric machine MG1 and the second rotary electric machine MG2.

In the embodiment, both the first rotary electric machine clutch Cm1 and the second rotary electric machine clutch Cm2 may be connected. In this case, the third rotary electric machine MG3 is connected to the first rotary electric machine MG1 and the second rotary electric machine MG2 so that the power is applied to both the first rotary electric machine MG1 and the second rotary electric machine MG2. In this way, in the embodiment, the third rotary electric machine MG3 applies the power to at least one of the first rotary electric machine MG1 and the second rotary electric machine MG2.

The first rotary electric machine MG1 is electrically connected to the capacitor 64 through a first inverter I1. The second rotary electric machine MG2 is electrically connected to the capacitor 64 through a second inverter I2. The third rotary electric machine MG3 is electrically connected to the capacitor 64 through a third inverter I3.

The capacitor 64 serves as a power storage device which exchanges the electric energy with the first rotary electric machine MG1, the second rotary electric machine MG2, and the third rotary electric machine MG3 and stores and discharges the electric energy.

The control device 27 receives detection signals from various detectors and transmits instruction signals to the first inverter I1, the second inverter I2, and the third inverter I3.

The instruction signals are signals for instructing a torque to be generated by the first rotary electric machine MG1, the second rotary electric machine MG2, and the third rotary electric machine MG3. In the embodiment, the control device 27 may transmit the rotation speed instructions of the first rotary electric machine MG1, the second rotary electric machine MG2, and the third rotary electric machine MG3 to the first inverter I1, the second inverter I2, and the third inverter I3. In this case, the first inverter I1, the second inverter I2, and the third inverter I3 calculate instruction torques corresponding to the rotation speed instructions and control the first rotary electric machine MG1, the second rotary electric machine MG2, and the third rotary electric machine MG3.

The control device 27 transmits an instruction signal for controlling a hydraulic pressure applied to each of the clutches CF, CR, CH, CL, Cm1, and Cm2 to the clutch control valve 38. The clutch control valve 38 includes a plurality of valves for respectively controlling the clutches CF, CR, CH, CL, Cm1, and Cm2.

Since the first rotary electric machine MG1, the second rotary electric machine MG2, the third rotary electric machine MG3, and the clutches CF, CR, CH, CL, Cm1, and Cm2 are controlled by the instruction signal from the control device 27, the transmission ratio and the output torque of the power transmission device 24 are controlled.

<Operation of Power Transmission Device 24>

Figure 4:
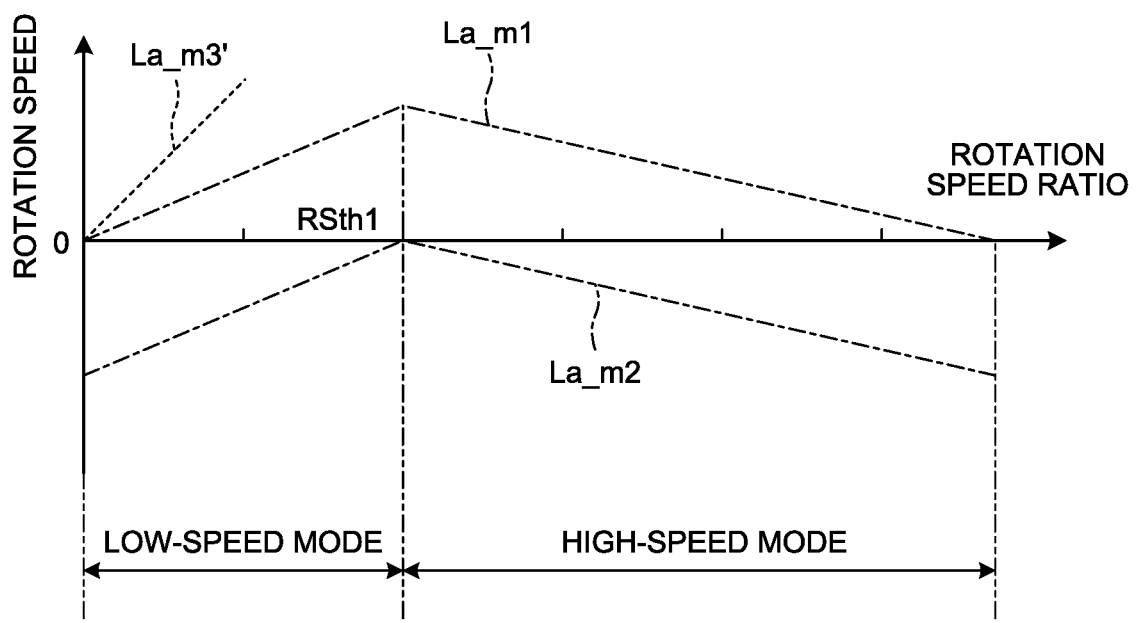
FIG. 4 is a diagram illustrating a rotation speed of each of a first rotary electric machine, a second rotary electric machine, and a third rotary electric machine with respect to a vehicle speed.

FIG. 4 is a diagram illustrating the rotation speed of each of the first rotary electric machine MG1, the second rotary electric machine MG2, and the third rotary electric machine MG3 with respect to the vehicle speed. FIG. 4 illustrates a relationship between the rotation speed ratio of the power transmission device 24 and the rotation speed of each of the first rotary electric machine MG1, the second rotary electric machine MG2, and the third rotary electric machine MG3. The rotation speed ratio corresponds to the vehicle speed of the wheel loader 1. Next, a schematic operation of the power transmission device 24 when the vehicle speed of the wheel loader 1 is increased from 0 to the forward movement side while the rotation speed of the internal-combustion engine 21 is maintained constantly will be described.

When the rotation speed of the internal-combustion engine 21 is constant, the vehicle speed of the wheel loader 1 is changed in response to the rotation speed ratio of the power transmission device 24. The rotation speed ratio indicates a ratio of the rotation speed of the output shaft 63 with respect to the rotation speed of the input shaft 61. Thus, in FIG. 4, a change in the rotation speed ratio of the power transmission device 24 matches a change in the vehicle speed. In FIG. 4, the one-dotted chain line La_m1 indicates the rotation speed of the first rotary electric machine MG1 and the one-dotted chain line La_m2 indicates the rotation speed of the second rotary electric machine MG2. The dashed line La_m3' indicates the rotation speed of the third rotary electric machine MG3. In FIG. 4, the rotation speed of each of the first rotary electric machine MG1, the second rotary electric machine MG2, and the third rotary electric machine MG3 illustrated in the vertical axis may be the ratio of the rotation speed of each of the first rotary electric machine MG1, the second rotary electric machine MG2, and the third rotary electric machine MG3 with respect to the rotation speed of the internal-combustion engine 21.

When the rotation speed ratio is a value from 0 to a predetermined threshold value RSth1, the power transmission path of the power transmission device 24 becomes the low-speed mode. In the low-speed mode, the low-speed clutch CL is connected and the high-speed clutch CH is disconnected. In the low-speed mode, since the high-speed clutch CH is disconnected, the second carrier C2 is disconnected from the first ring gear R1. Further, in the low-speed mode, since the low-speed clutch CL is connected, the second carrier C2 is fixed.

In the low-speed mode, the power generated from the internal-combustion engine 21 is input to the first sun gear S1 through the transmission shaft 67 and is output from the first carrier C1 to the second sun gear S2. The power input to the first sun gear S1 is transmitted from the first planetary gear P1 to the first ring gear R1 and is output to the second rotary electric machine MG2 through the first ring outer circumferential gear Gr1 and the second rotary electric machine gear Gm2. The second rotary electric machine MG2 mainly serves as a generator in the low-speed mode. A part of the electric power generated by the second rotary electric machine MG2 is stored in the capacitor 64. Further, a part of the electric power generated by the second rotary electric machine MG2 drives the first rotary electric machine MG1.

In the low-speed mode, the first rotary electric machine MG1 mainly serves as an electric motor which generates power. The power of the first rotary electric machine MG1 is output to the second sun gear S2 through the first rotary electric machine gear Gm1, the first carrier gear Gc1, and the first carrier C1. In this case, the electric power is supplied from the second rotary electric machine MG2 or the capacitor 64 if necessary to the first rotary electric machine MG1. In this way, the power output to the second sun gear S2 is transmitted to the output shaft 63 through the second planetary gear P2, the second ring gear R2, the second ring outer circumferential gear Gr2, and the output gear 71.

In the low-speed mode, when it is determined that the assistance of the third rotary electric machine MG3 is necessary, the third rotary electric machine MG3 is connected to at least one of the first rotary electric machine MG1 and the second rotary electric machine MG2. When it is determined that the assistance of the third rotary electric machine MG3 is not necessary, the third rotary electric machine MG3 is not connected to any one of the first rotary electric machine MG1 and the second rotary electric machine MG2. When the assistance of the third rotary electric machine MG3 is not necessary, both the first rotary electric machine clutch Cm1 and the second rotary electric machine clutch Cm2 are disconnected. In FIG. 4, the solid line La_m3 in the low-speed mode indicates the rotation speed of the third rotary electric machine MG3 when the assistance of the third rotary electric machine MG3 is not necessary.

When the third rotary electric machine MG3 assists the first rotary electric machine MG1 in the low-speed mode, the first rotary electric machine clutch Cm1 is connected and the second rotary electric machine clutch Cm2 is disconnected. Thus, the first connection gear Ga1 is connected to the rotation shaft Sm3 of the third rotary electric machine MG3 and the second connection gear Ga2 is disconnected from the rotation shaft Sm2 of the second rotary electric machine MG2. As a result, the power of the third rotary electric machine MG3 is transmitted to the first rotary electric machine MG1 through the third rotary electric machine gear Gm3, the first connection gear Ga1, and the first rotary electric machine clutch Cm1. In FIG. 4, the dashed line La_m3' in the low-speed mode indicates the rotation speed of the third rotary electric machine MG3 when the first rotary electric machine MG1 is assisted by the third rotary electric machine MG3.

In the low-speed mode, when the third rotary electric machine MG3 assists the second rotary electric machine MG2, the first rotary electric machine clutch Cm1 is disconnected and the second rotary electric machine clutch Cm2 is connected. Further, the first connection gear Ga1 is disconnected from the rotation shaft Sm1 of the first rotary electric machine MG1.

When the rotation speed ratio exceeds RSth1, the power transmission path of the power transmission device 24 becomes the high-speed mode. In the high-speed mode, the high-speed clutch CH is connected and the low-speed clutch CL is disconnected. In the high-speed mode, since the high-speed clutch CH is connected, the second carrier C2 is connected to the first ring gear R1. Since the low-speed clutch CL is disconnected, the fixing of the second carrier C2 is canceled. Thus, the first ring gear R1 and the second carrier C2 have the same rotation speed.

The control device 27 controls the torque output from the power transmission device 24 by controlling the torque of the first rotary electric machine MG1, the torque of the second rotary electric machine MG2, and the torque of the third rotary electric machine MG3. With this control, the control device 27 controls the traction force of the wheel loader 1.

<Instruction Torque Determination Method for First Rotary Electric Machine MG1 and Second Rotary Electric Machine MG2>

Figure 5:
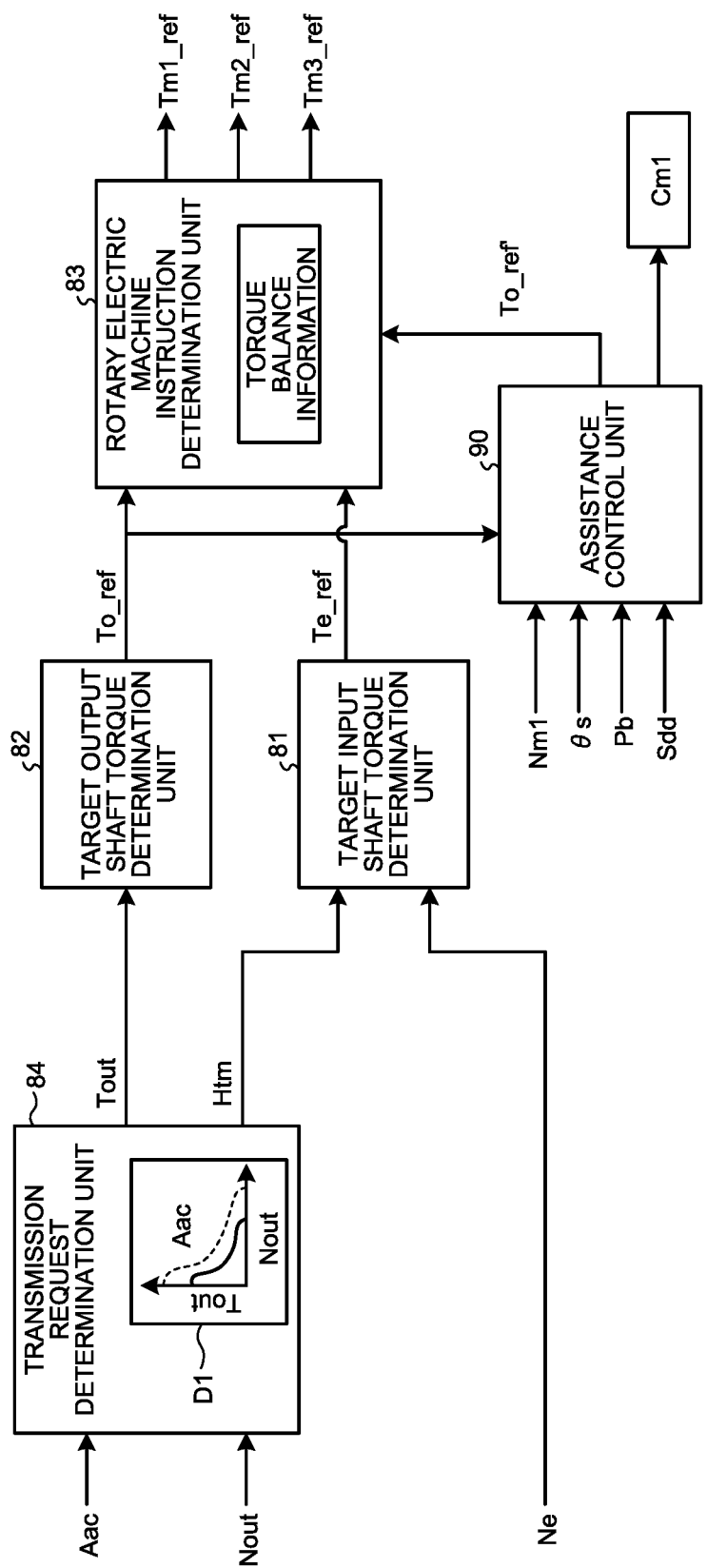
FIG. 5 is a block diagram illustrating a process to be executed by a control device.

FIG. 5 is a block diagram illustrating a process to be executed by the control device 27. As illustrated in FIG. 5, the control device 27 includes a target output shaft torque determination unit 82, a target input shaft torque determination unit 81, a rotary electric machine instruction determination unit 83, a transmission request determination unit 84, and an assistance control unit 90.

The transmission request determination unit 84 determines a requested traction force Tout based on an accelerator operation amount Aac and an output rotation speed Nout. Specifically, the transmission request determination unit 84 determines the requested traction force Tout from the output rotation speed Nout based on the requested traction force characteristic information D1 stored in the storage unit 27M. The requested traction force characteristic information D1 is data representing the requested traction force characteristic for defining a relationship between the output rotation speed Nout and the requested traction force Tout. The output rotation speed Nout and the rotation speed ratio have the same meaning.

The requested traction force characteristic is changed in response to the accelerator operation amount Aac. In the requested traction force characteristic, the traction force characteristic is determined so that the requested traction force increases at the same speed corresponding to the accelerator operation amount Aac. The transmission request determination unit 84 determines the requested traction force Tout from the requested traction force characteristic information D1, the accelerator operation amount Aac, and the output rotation speed Nout. Further, the required transmission horsepower Htm is determined from the product of the output rotation speed Nout and the requested traction force Tout.

The target output shaft torque determination unit 82 determines a target output shaft torque To_ref. The target output shaft torque To_ref is a target value of the torque output from the power transmission device 24. The target output shaft torque To_ref corresponds to a target traction force, that is, a target value of the traction force generated by the traveling device 25 of the wheel loader 1. The traction force is the sum of the driving force generated by the drive wheel of the wheel loader 1.

The target output shaft torque determination unit 82 determines the target output shaft torque To_ref based on the requested traction force Tout determined by the transmission request determination unit 84. Specifically, the target output shaft torque determination unit 82 determines the target output shaft torque To_ref by multiplying the distribution ratio by the requested traction force Tout. The distribution ratio is set so that, for example, the sum of the required working equipment horsepower and the required transmission horsepower Htm obtained from the separately required lever operation and the load of the working equipment 5 does not exceed the horsepower output from the internal-combustion engine 21.

The target input shaft torque determination unit 81 determines a target input shaft torque Te_ref. The target input shaft torque Te_ref is a target value of the torque input to the power transmission device 24. The target input shaft torque determination unit 81 determines the target input shaft torque Te_ref from the required transmission horsepower Htm. Specifically, the target input shaft torque determination unit 81 calculates the target input shaft torque Te_ref from a value obtained by multiplying a predetermined distribution ratio by the required transmission horsepower Htm and the rotation speed Ne of the internal-combustion engine 21.

The rotary electric machine instruction determination unit 83 determines an instruction torque Tm1_ref of the first rotary electric machine MG1 and an instruction torque Tm2_ref of the second rotary electric machine MG2 by torque balance information from the target input shaft torque Te_ref and the target output shaft torque To_ref. The torque balance information defines a relationship between the target input shaft torque Te_ref and the target output shaft torque To_ref to satisfy the balance of the torque in the power transmission device 24. The torque balance information is stored in the storage unit 27M.

The rotary electric machine instruction determination unit 83 determines an instruction torque Tm3_ref of the third rotary electric machine MG3 when the assistance of the third rotary electric machine MG3 is necessary. The rotary electric machine instruction determination unit 83 sets the instruction torque Tm3_ref based on the value of the power requiring the assistance.

As described above, the low-speed mode and the high-speed mode are different in the power transmission path of the power transmission device 24. For this reason, the rotary electric machine instruction determination unit 83 determines the instruction torque Tm1_ref to the first rotary electric machine MG1 and the instruction torque Tm2_ref to the second rotary electric machine MG2 by using different kinds of torque balance information in the low-speed mode and the high-speed mode.

In addition, the control device 27 controls the internal-combustion engine 21 by transmitting the instruction signal to the fuel injection device 28. The instruction throttle value to the fuel injection device 28 is determined by the required working equipment horsepower, the required transmission horsepower Htm, and the distribution ratio.

<Assistance Control>

The control device 27 executes an assistance control which is a first control. The assistance control is a control of increasing the traction force of the traveling device 25 by applying the power of the third rotary electric machine MG3 to at least one of the first rotary electric machine MG1 and the second rotary electric machine MG2. The assistance control is executed by the assistance control unit 90 of the control device 27. In the embodiment, the descending suppression control will be described as an example of the assistance control.

Figure 6:
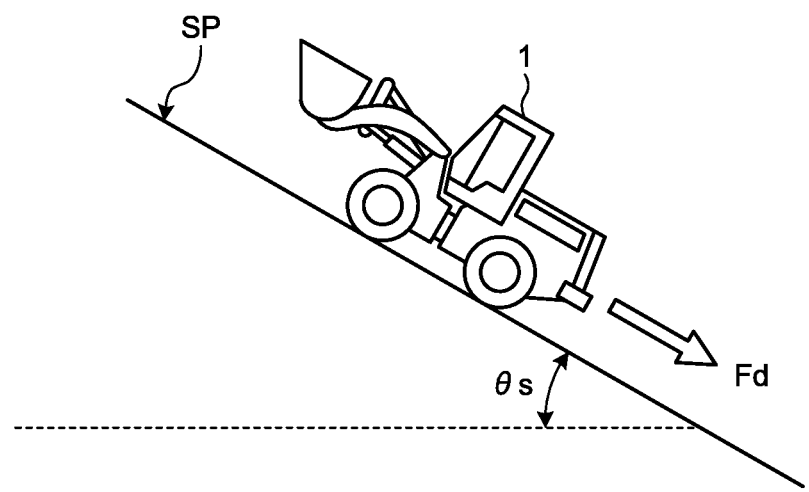
FIG. 6 is a diagram illustrating a descending suppression control which is an example of an assistance control according to an embodiment.

FIG. 6 is a diagram illustrating the descending suppression control which is an example of the assistance control according to the embodiment. The descending suppression control is a control of applying power for moving the traveling device 25 in a traveling direction determined by a traveling direction instruction value by the third rotary electric machine MG3 when the traveling direction instruction value corresponding to the instruction value for determining the forward movement or the backward movement of the traveling device 25 is different from an actual traveling direction of the traveling device 25. FIG. 6 illustrates a state in which the wheel loader 1 ascending the inclined surface SP stops on the inclined surface SP. In this case, the traveling direction instruction value instructs the forward movement. Since the wheel loader 1 stopping on the inclined surface SP receives a force Fd in a direction moving down the inclined surface SP, the wheel loader will move in a direction different from the traveling direction instruction value, more specifically, the opposite direction and the rear direction in the example illustrated in FIG. 6 when the braking force of the traveling device 25 decreases. In such a case, the control device 27 executes the descending suppression control and the traveling device 25 suppresses the vehicle speed at the time when the vehicle travels in a direction different from the traveling direction instruction value.

Figure 7:
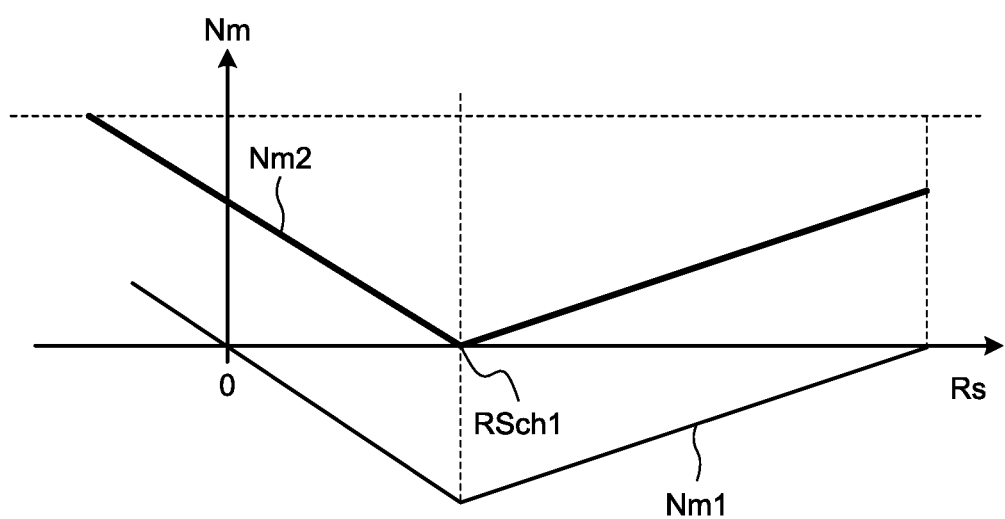
FIG. 7 is a diagram illustrating a relationship among a rotation speed of the first rotary electric machine, a rotation speed of the second rotary electric machine, and a rotation speed ratio.

FIG. 7 is a diagram illustrating a relationship between a first rotation speed Nm1 of the first rotary electric machine MG1 and a rotation speed Nm2 of the second rotary electric machine MG2, and a rotation speed ratio Rs. When the wheel loader 1 stops on the inclined surface SP, the rotation speed ratio Rs becomes 0. When the wheel loader 1 ascending the inclined surface SP stops on the inclined surface SP and moves in a direction different from the traveling direction instruction value, that is, the rear direction, the rotation speed ratio Rs becomes a negative value. In this case, since the rotation speed ratio Rs is smaller than the threshold value RSch1, the power transmission path of the power transmission device 24 is in the low-speed mode. In the low-speed mode, since the low-speed clutch CL is connected and the high-speed clutch CH is disconnected, the rotation speed Nm2 of the second rotary electric machine MG2 increases and becomes larger than the first rotation speed Nm1 of the first rotary electric machine MG1 when the rotation speed ratio Rs becomes a negative value. The descending suppression control suppresses the excessive rotation of the second rotary electric machine MG2 and suppresses the uncomfortable feeling of the operator.

Since the descending suppression control is executed when the traveling direction instruction value corresponding to the instruction value for determining the forward movement or the backward movement of the traveling device 25 is different from the actual traveling direction of the traveling device 25, the control is also executed when the wheel loader 1 moves forward while the traveling direction instruction value instructs the backward movement. For example, when the wheel loader 1 ascending while moving backward on the inclined surface SP stops on the inclined surface SP and moves forward, the descending suppression control is executed.

The assistance control unit 90 of the control device 27 illustrated in FIG. 5 executes the descending suppression control. In the embodiment, the first rotation speed Nm1 of the first rotary electric machine MG1 (hereinafter, appropriately referred to as a first rotation speed), the inclination angle θs of the wheel loader 1, the braking pressure Pb, the traveling direction instruction value Sdd, and the target output shaft torque To_ref are input to the assistance control unit 90. The assistance control unit 90 generates and outputs a correction target output shaft torque To_ref' and controls the first rotary electric machine clutch Cm1 based on these input information. The correction target output shaft torque To_ref' is output to the rotary electric machine instruction determination unit 83. The correction target output shaft torque To_ref' is a correction value of the target traction force.

The first rotation speed Nm1 is a detection value of the first rotation speed detector RB1 illustrated in FIG. 3. The first rotation speed Nm1 is used to detect an actual vehicle speed of the wheel loader 1. The vehicle speed of the wheel loader 1 is used to determine whether to execute the descending suppression control. As described above, when the wheel loader 1 moves in a direction different from the traveling direction instruction value Sdd, there is a possibility that the second rotary electric machine MG2 may excessively rotate. Accordingly, it is desirable that the descending suppression control have high determination accuracy. Since the detection accuracy of the first rotation speed detector RB1 is larger than that of the vehicle speed detector 37, it is desirable to use the detection value of the first rotation speed detector RB1 for determining whether to execute the descending suppression control or not. However, a case in which the detection value of the vehicle speed detector 37 illustrated in FIG. 3 is used for the determination on whether to execute the descending suppression control or not is not excluded.

The inclination angle θs is an inclination angle of the pitch direction of the wheel loader 1. The pitch direction of the wheel loader 1 is a rotation direction about the Y axis illustrated in FIG. 1. The inclination angle of the pitch direction of the wheel loader 1 is an angle formed between the horizontal plane and the X axis which is the longitudinal axis of the wheel loader 1. The inclination angle θs is a detection value of the inclination detector 59 illustrated in FIG. 2. The traveling direction instruction value Sdd is a detection value of the forward/backward movement position detector 54b illustrated in FIG. 2.

Figure 8:
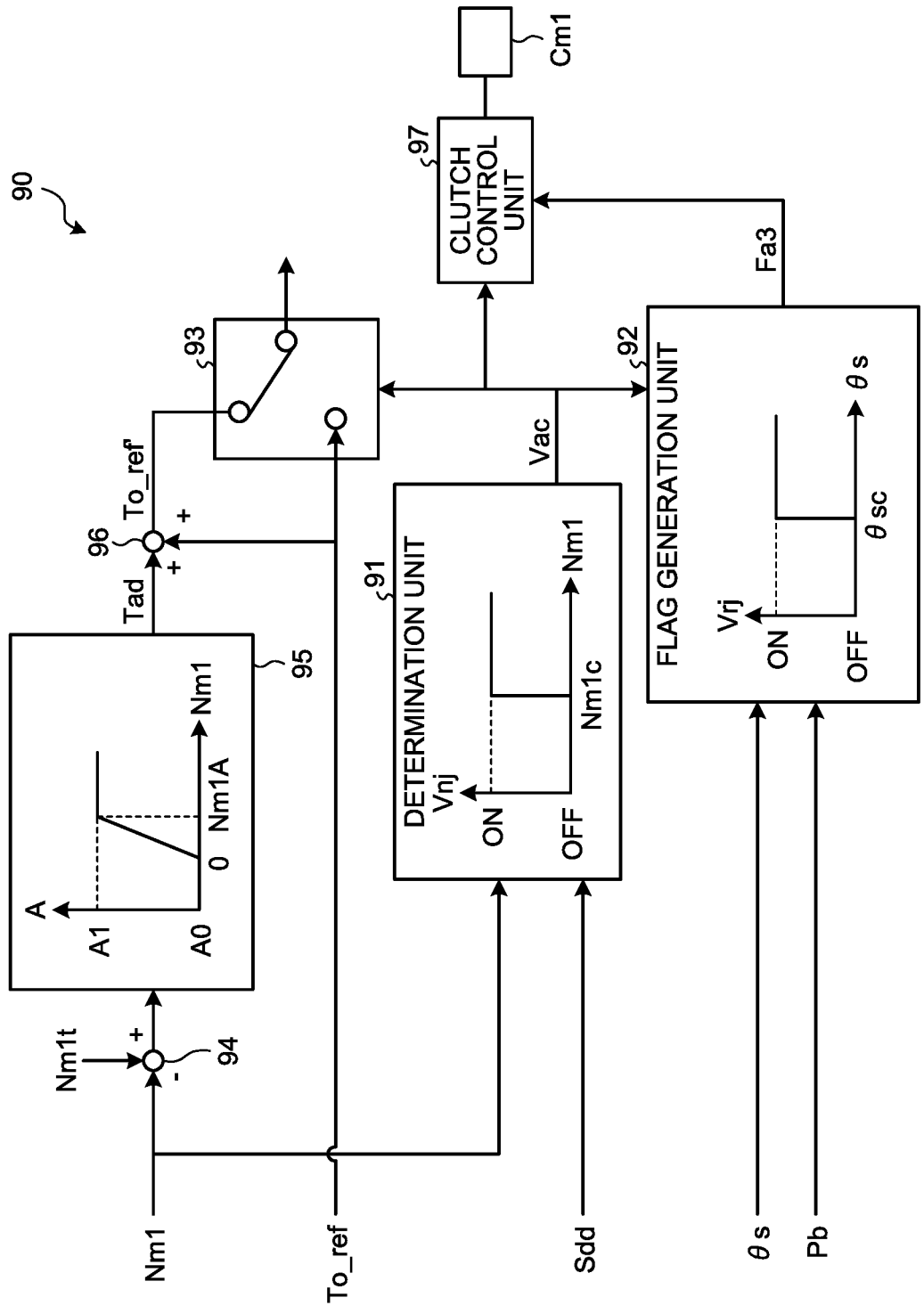
FIG. 8 is a diagram illustrating a control block of an assistance control unit of the control device according to the embodiment.

FIG. 8 is a diagram illustrating a control block of the assistance control unit 90 of the control device 27 according to the embodiment. The assistance control unit 90 includes a determination unit 91, a flag generation unit 92, a switching unit 93, an adder/subtractor 94, a gain addition unit 95, an adder/subtractor 96, and a clutch control unit 97.

The determination unit 91 acquires the first rotation speed Nm1 and the traveling direction instruction value Sdd and determines whether to execute the descending suppression control. In this case, the determination unit 91 determines whether the traveling direction instruction value Sdd matches the actual traveling direction (hereinafter, appropriately referred to as an actual traveling direction) of the wheel loader 1 obtained from the first rotation speed Nm1. Specifically, when the first rotation speed Nm1 becomes a speed threshold value Nm1c or exceeds the speed threshold value Nm1c, the determination unit 91 sets the vehicle speed determination value Vnj to an ON state. When the first rotation speed Nm1 does not exceed the speed threshold value Nm1c, the determination unit 91 sets the vehicle speed determination value Vnj to an OFF state. That is, the determination unit 91 sets the vehicle speed determination value Vnj to an ON state when the absolute value of the first rotation speed Nm1 becomes equal to or larger than the speed threshold value Nm1c and sets the vehicle speed determination value Vnj to an OFF state when the absolute value of the first rotation speed Nm1 becomes smaller than the speed threshold value Nm1c.

The speed threshold value Nm1c is the rotation speed Nm1 of the first rotary electric machine MG1, for example, when the wheel loader 1 travels in a direction opposite to the traveling direction instruction value Sdd and can be within a range in which the rotation speed Nm2 of the second rotary electric machine MG2 is allowable. In the embodiment, the speed threshold value Nm1c is a value other than 0, but the speed threshold value Nm1c may be 0. The speed threshold value Nm1c may be different when the vehicle speed determination value Vnj is set to an ON state and an OFF state. With such a configuration, hunting is suppressed when the vehicle speed determination value Vnj is set to an ON state and an OFF state.

When the vehicle speed determination value Vnj is an ON state and the traveling direction instruction value Sdd is not the same as the actual traveling direction, the determination unit 91 sets a control execution instruction Vac to an ON state and outputs the control execution instruction to the flag generation unit 92 and the switching unit 93. In this case, the descending suppression control is executed. The determination unit 91 sets the control execution instruction Vac to an OFF state when at least one of a case in which the vehicle speed determination value Vnj is an OFF state and a case in which the traveling direction instruction value Sdd is the same as the actual traveling direction is established. In this case, the descending suppression control is not executed. In this way, the determination unit 91 determines whether to execute the descending suppression control or not.

The control execution instruction Vac is input from the determination unit 91 to the clutch control unit 97 and an assistance flag Fa3 is input from the flag generation unit 92 to the clutch control unit 97. When the control execution instruction Vac is an ON state, the clutch control unit 97 connects the first rotary electric machine clutch Cm1 illustrated in FIG. 3 to set the first connection state. With this process, the third rotary electric machine MG3 is connected to the first rotary electric machine MG1. When the control execution instruction Vac is an OFF state, the clutch control unit 97 disconnects the first rotary electric machine clutch Cm1. In this case, the third rotary electric machine MG3 is not connected to the first rotary electric machine MG1. When the clutch control unit 97 receives the assistance flag Fa3 from the flag generation unit 92, the connection of the first rotary electric machine clutch Cm1 is maintained even when the control execution instruction Vac is an OFF state.

The target output shaft torque To_ref, the correction target output shaft torque To_ref', and the control execution instruction Vac are input to the switching unit 93. The switching unit 93 outputs the correction target output shaft torque To_ref' to the rotary electric machine instruction determination unit 83 when the control execution instruction Vac is an ON state and outputs the target output shaft torque To_ref to the rotary electric machine instruction determination unit 83 when the control execution instruction Vac is an OFF state. The rotary electric machine instruction determination unit 83 which acquires the correction target output shaft torque To_ref' obtains the instruction torque Tm1_ref of the first rotary electric machine MG1, the instruction torque Tm2_ref of the second rotary electric machine MG2, and the instruction torque Tm3_ref of the third rotary electric machine MG3. The instruction torque Tm3_ref of the third rotary electric machine MG3 is a difference between the correction target output shaft torque To_ref' and the target output shaft torque To_ref.

The correction target output shaft torque To_ref' is generated so that the first rotation speed Nm1 becomes a target rotation speed Nm1t which is a target rotation speed of the first rotary electric machine MG1 during the descending suppression control. In the embodiment, the target rotation speed Nm1t is set to 0 rpm (revolution per minute). In this case, since the vehicle speed of the wheel loader 1 becomes 0 m/s, the wheel loader 1 stops on the inclined surface SP. That is, the target rotation speed Nm1t indicates the rotation speed of the first rotation speed Nm1 when the wheel loader 1 stops on the inclined surface SP. The first rotation speed Nm1 is not limited to 0 rpm when the rotation speed Nm2 of the second rotary electric machine MG2 is a value within an allowable range.

The adder/subtractor 94 transmits a value obtained by subtracting the first rotation speed Nm1 from the target rotation speed Nm1t to the gain addition unit 95. With such a process, the assistance control unit 90 can change the correction target output shaft torque To_ref' in response to the first rotation speed Nm1. Specifically, since the assistance control unit 90 increases the correction target output shaft torque To_ref' when a difference between the first rotation speed Nm1 and the target rotation speed Nm1t increases, the descending of the wheel loader 1 can be promptly suppressed.

The gain addition unit 95 obtains a torque increase amount Tad by multiplying a gain A by a value acquired from the adder/subtractor 94 and outputs the torque increase amount to the adder/subtractor 96. The adder/subtractor 96 adds the target output shaft torque To_ref and the torque increase amount Tad acquired from the gain addition unit 95 and obtains the correction target output shaft torque To_ref'. The adder/subtractor 96 outputs the obtained correction target output shaft torque To_ref' to the switching unit 93.

Figure 9:
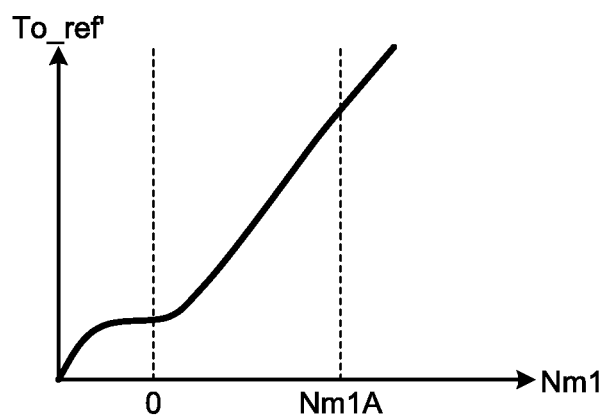
FIG. 9 is a diagram illustrating an example of a relationship between a correction target output shaft torque and a first rotation speed.

FIG. 9 is a diagram illustrating an example of a relationship between the correction target output shaft torque To_ref' and the first rotation speed Nm1. As illustrated in FIG. 8, the gain A increases as the first rotation speed Nm1 becomes larger than 0 and becomes a constant value A1 when the first rotation speed Nm1 becomes Nm1A. With such a configuration, as illustrated in FIG. 9, the correction target output shaft torque To_ref' monotonously increases from the vicinity of the vehicle speed of 0 m/s of the wheel loader 1. As a result, the assistance control unit 90 can suppress the hunting of the value of the correction target output shaft torque To_ref' when the vehicle speed of the wheel loader 1 is in the vicinity of 0 m/s.

The flag generation unit 92 acquires the braking pressure Pb, the inclination angle θs, and the control execution instruction Vac from the determination unit 91. The flag generation unit 92 outputs the assistance flag Fa3 when the control execution instruction Vac is an ON state and the inclination determination value Vrj is an ON state. The flag generation unit 92 does not output the assistance flag Fa3 when at least one of a case in which the control execution instruction Vac is an OFF state and a case in which the inclination determination value Vrj is an OFF state is established.

In the embodiment, the inclination determination value Vrj becomes an ON state when the inclination angle θs becomes equal to or larger than a threshold value θsc and becomes an OFF state when the inclination angle θs becomes equal to or smaller than a threshold value θse. The threshold value θsc may be different when the inclination determination value Vrj is set to an ON state and an OFF state. With such a configuration, the hunting of the determination on whether to generate the assistance flag Fa3 or not is suppressed.

When the assistance flag Fa3 is generated, the control device 27 controls the first inverter I1, the second inverter I2, and the third inverter I3 so that the torque generated by the first rotary electric machine MG1, the second rotary electric machine MG2, and the third rotary electric machine MG3 becomes the correction target output shaft torque To_ref'. In this case, the control device 27 gives the instruction torque Tm3_ref for the third rotary electric machine MG3, that is, a difference between the correction target output shaft torque To_ref' and the target output shaft torque To_ref to the third inverter I3. The third inverter I3 controls the third rotary electric machine MG3 so that the instruction torque Tm3_ref is generated. With this control, the third rotary electric machine MG3 starts the applying of the power. That is, the power of the third rotary electric machine MG3 is applied to the first rotary electric machine MG1.

In the embodiment, when the control device 27 executes the descending suppression control, the clutch control unit 97 connects the first rotary electric machine clutch Cm1 to become the first connection state and then the third rotary electric machine MG3 generates the instruction torque Tm3_ref to start the applying of the power. In this way, in the descending suppression control of the embodiment, the third rotary electric machine MG3 starts the applying of the power after the current state becomes the first connection state, that is, the third rotary electric machine MG3 and the first rotary electric machine MG1 are connected to each other. As a result, the control device 27 can suppress an impact caused by the connection of the first rotary electric machine clutch Cm1. In the embodiment, the applying of the power from the third rotary electric machine MG3 also includes a case in which the power is generated from the third rotary electric machine MG3 and a case in which the power is transmitted from the third rotary electric machine MG3 to the first rotary electric machine clutch Cm1.

Figure 10:
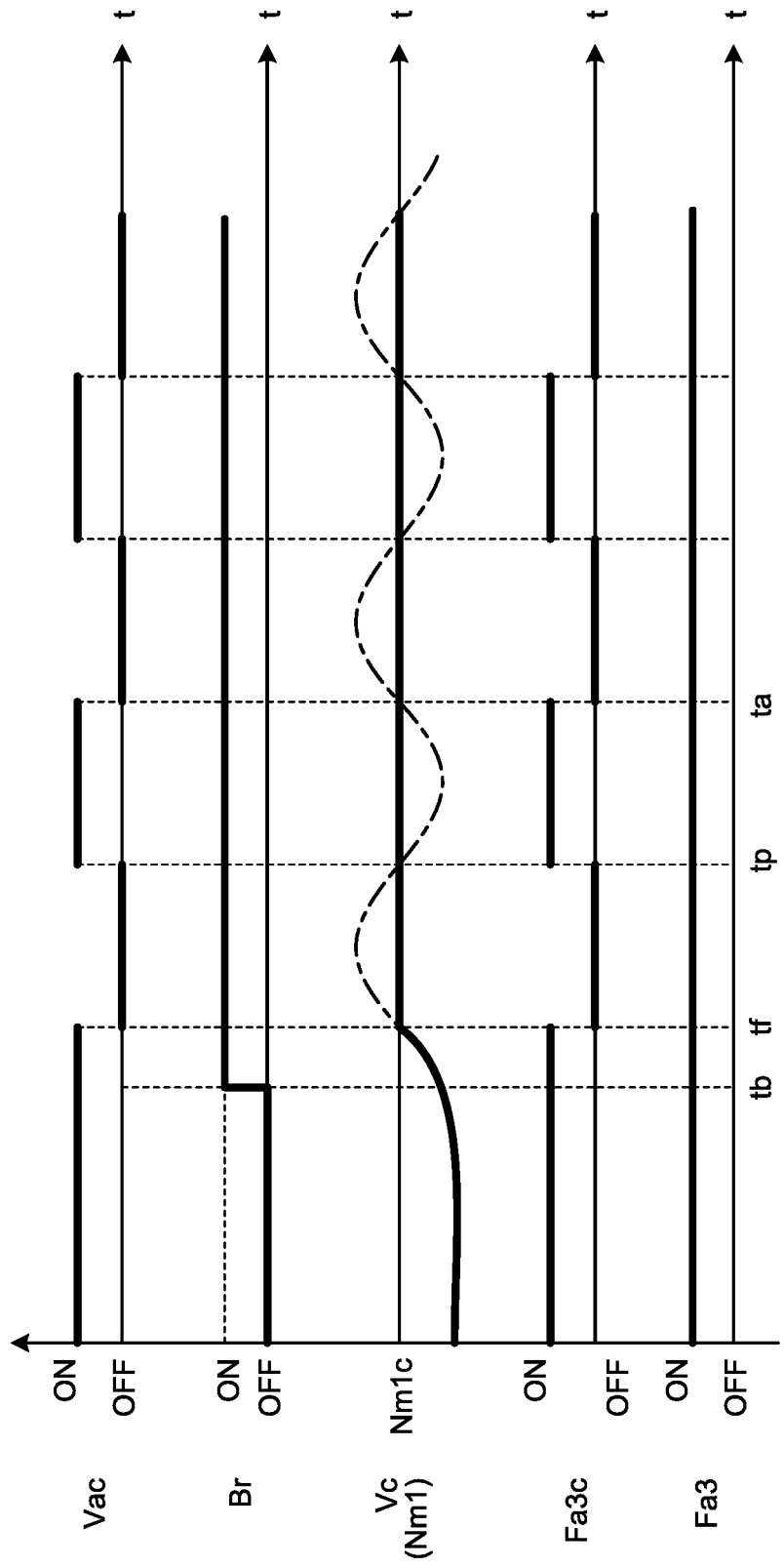
FIG. 10 is a timing chart of an operation of the wheel loader, an assistance flag according to the embodiment, and an assistance flag according to a comparative example.

FIG. 10 is a timing chart illustrating the operation of the wheel loader 1, the assistance flag Fa3 according to the embodiment, and the assistance flag Fa3c according to the comparative example. A horizontal axis of FIG. 10 indicates the time t. A vertical axis of FIG. 10 indicates the control execution instruction Vac, the braking determination value Br indicating a state on whether the braking device 58BK generates a braking force which is larger than the braking force threshold value, the vehicle speed Vc of the traveling device 25 of the wheel loader 1, the assistance flag Fa3c according to the comparative example, and the assistance flag Fa3 according to the embodiment from above. When the braking device 58BK generates a braking force which is larger than the braking force threshold value, the braking determination value Br becomes an ON state. Then, when the braking device 58BK generates a braking force which is equal to or smaller than the braking force threshold value, the braking determination value Br becomes an OFF state.

When the descending suppression control is executed while the wheel loader 1 is located on the inclined surface SP, the determination unit 91 sets the vehicle speed determination value Vnj to an OFF state when the first rotation speed Nm1 is not equal to or larger than the speed threshold value Nm1c. In the embodiment, the determination unit 91 sets the vehicle speed determination value Vnj to an OFF state when the absolute value of the first rotation speed Nm1 becomes smaller than the speed threshold value Nm1c. When the vehicle speed determination value Vnj becomes an OFF state, the control execution instruction Vac output from the determination unit 91 becomes an OFF state and thus the flag generation unit 92 does not generate the assistance flag Fa3. As a result, the switching unit 93 transmits the target output shaft torque To_ref to the rotary electric machine instruction determination unit 83 instead of the correction target output shaft torque To_ref'. As a result, since the instruction torque Tm3_ref for the third rotary electric machine MG3 becomes 0, the third rotary electric machine MG3 does not generate power. As a result, the descending suppression control is canceled. In this way, when the vehicle speed Vc of the traveling device 25 does not exceed the speed threshold value Nm1c, that is, the vehicle speed Vc of the traveling device 25 is smaller than the speed threshold value Nm1c, the control device 27 executes the assistance control which is the first control, that is, the second control of canceling the descending suppression control of the embodiment.

When the brake operation member 58a is stepped on at the time t=tb during the descending suppression control of the first control so that the braking device 58BK generates the braking force, the wheel loader 1 is stopped. Since the wheel loader 1 is stopped, when the absolute value of the first rotation speed Nm1 becomes smaller than the speed threshold value Nm1c, the control device 27 executes the second control at the time t=tf so that the descending suppression control is canceled. A state in which the assistance flag Fa3c according to the comparative example changes from an ON state to an OFF state at the time t=tf indicates a state in which the descending suppression control is canceled. Since the first rotary electric machine clutch Cm1 is disconnected when the descending suppression control is canceled, the power of the third rotary electric machine MG3 is not transmitted to the first rotary electric machine MG1. As a result, the torque of the first rotary electric machine gear Gm1 decreases.

The backlash of the gears of the power transmission device 24 and the traveling device 25 and the twisting of the shafts of the power transmission device 24 and the traveling device 25 exist. As the torque output from the first rotary electric machine gear Gm1 decreases, the twisting of the shaft is returned so that the first rotary electric machine MG1 rotates or the first rotary electric machine MG1 rotates to the degree of the backlash of the gear. As a result, the absolute value of the first rotation speed Nm1 becomes equal to or larger than the speed threshold value Nm1c. Then, the control device 27 executes the descending suppression control at the time t=tp so that the first rotary electric machine clutch Cm1 is connected and the power is output from the third rotary electric machine MG3. A state in which the assistance flag Fa3c according to the comparative example changes from an OFF state to an ON state at the time t=tp indicates a state in which the descending suppression control is executed.

When the first rotary electric machine clutch Cm1 is connected by executing the descending suppression control at the time t=tp, the absolute value of the first rotation speed Nm1 decreases. When the absolute value of the first rotation speed Nm1 becomes smaller than the speed threshold value Nm1c at the time t=ta, the descending suppression control is canceled again. In this way, in the comparative example, when the brake operation member 58a is stepped on so that the braking device 58BK generates the braking force during the descending suppression control, the connection/disconnection of the first rotary electric machine clutch Cm1 are repeated. As a result, in the comparative example, since the vehicle speed Vc is vibrated as indicated by the one-dotted chain line of FIG. 10, the wheel loader 1 is vibrated.

The braking force of the braking device 58BK is proportional to the braking pressure Pb. Thus, the braking pressure Pb may be treated as the braking force of the braking device 58BK. In the embodiment, the flag generation unit 92 generates the assistance flag Fa3 even when the control execution instruction Vac is an OFF state at the time t=tf when the braking force of the braking device 58BK, that is, the braking pressure Pb is larger than a braking pressure threshold value Pbc which is a braking force threshold value. For this reason, the control device 27 causes the third rotary electric machine MG3 to apply power to the first rotary electric machine MG1 even when the control execution instruction Vac is an OFF state when the braking pressure Pb is larger than the braking pressure threshold value Pbc, that is, the braking determination value Br is an ON state in FIG. 10. Then, the control device 27 maintains the connection of the first rotary electric machine clutch Cm1 and allows the third rotary electric machine MG3 to continuously apply power to the first rotary electric machine MG1 even when the control execution instruction Vac becomes an OFF state so that the descending suppression control is canceled. As a result, it is possible to prevent the connection/disconnection of the first rotary electric machine clutch Cm1 from being repeated even when the brake operation member 58a is stepped on so that the braking device 58BK generates the braking force during the descending suppression control. As a result, in the embodiment, since the vibration of the vehicle speed Vc is suppressed as indicated by the solid line of FIG. 10, the vibration of the wheel loader 1 is suppressed.

When the control execution instruction Vac is an OFF state and the braking pressure Pb is equal to or smaller than the braking pressure threshold value Pbc, the flag generation unit 92 does not generate the assistance flag Fa3. That is, the control device 27 stops the applying of the power from the third rotary electric machine MG3 to the first rotary electric machine MG1.

Figure 11:
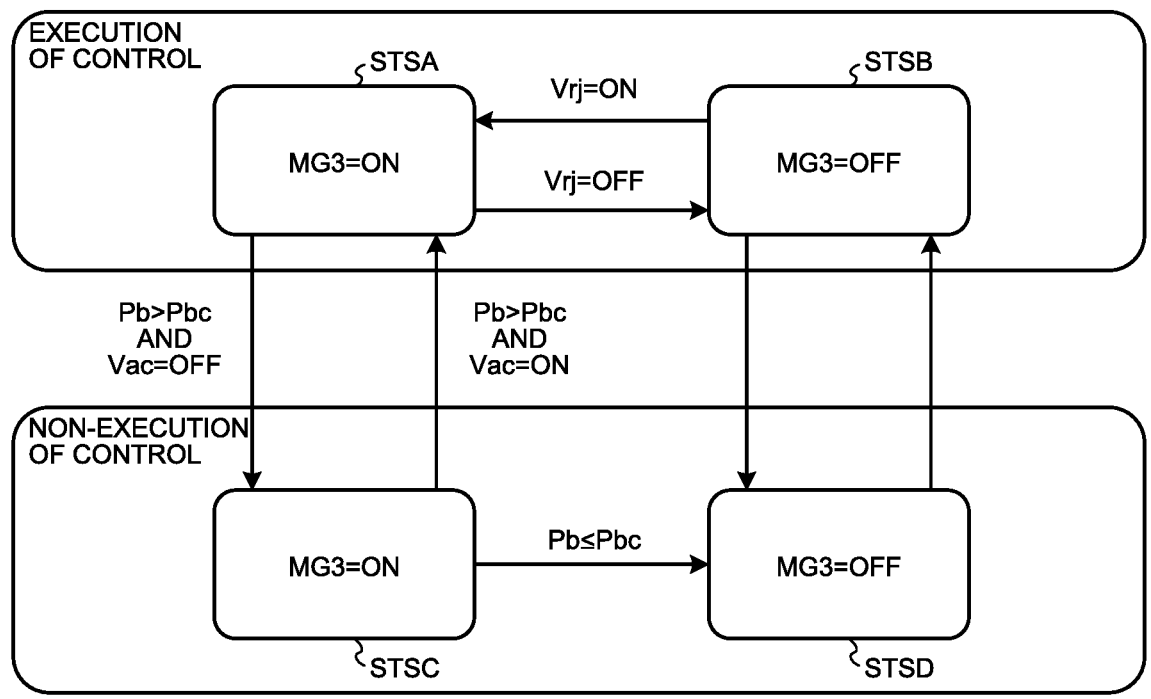
FIG. 11 is a diagram illustrating a transition of a descending suppression control state according to the embodiment.

FIG. 11 is a diagram illustrating a transition of the descending suppression control state according to the embodiment. The descending control changes among a state STSA, a state STSB, a state STSC, and a state STSD. In the state STSA and the state STSC, the power is generated from the third rotary electric machine MG3 and the first rotary electric machine clutch Cm1 is connected. In the state STSB and the state STSD, the power is not generated from the third rotary electric machine MG3 and the first rotary electric machine clutch Cm1 is disconnected.

Since the assistance flag Fa3 is generated by the flag generation unit 92 when the inclination determination value Vrj becomes an ON state during the descending suppression control, that is, the first control, the descending suppression control state changes from the state STSB to the state STSA. In the state STSA, the third rotary electric machine MG3 applies power to the first rotary electric machine MG1. That is, the control device 27 applies the power of the third rotary electric machine MG3 to the first rotary electric machine MG1 when it is determined that the wheel loader 1 is located on the inclined surface SP. Since the flag generation unit 92 does not generate the assistance flag Fa3 when the inclination determination value Vrj becomes an OFF state in the state STSA, the descending suppression control state changes from the state STSA to the state STSB.

When the control execution instruction Vac becomes an OFF state during the descending suppression control, the descending suppression control state changes from the state STSB to the state STSD. In the state STSD, the descending suppression control is not executed. In the state STSD, when the control execution instruction Vac becomes an ON state, the descending suppression control state changes from the state STSD to the state STSB. In the state STSB, the descending suppression control is executed, but the third rotary electric machine MG3 does not generate power.

In the state STSA, when the control execution instruction Vac becomes an OFF state and the braking pressure Pb becomes larger than the braking pressure threshold value Pbc, the descending suppression control state changes from the state STSA to the state STSC. In the state STSC, the descending suppression control is not executed. However, the third rotary electric machine MG3 generates power and the first rotary electric machine clutch Cm1 is maintained in a connection state. In the state STSC, when the braking pressure Pb becomes equal to or smaller than the braking pressure threshold value Pbc, the descending suppression control state changes from the state STSC to the state STSD. In the state STSC, when the braking pressure Pb is larger than the braking pressure threshold value Pbc and the control execution instruction Vac becomes an ON state, the descending suppression control state changes from the state STSC to the state STSA.

As described above, in the embodiment, the third rotary electric machine MG3 continuously applies power to the first rotary electric machine MG1 when the braking force of the braking device 58BK is larger than the braking force threshold value at the time of canceling the descending suppression control from the state in which the descending suppression control is executed. For this reason, in the embodiment, it is possible to prevent the connection/disconnection of the first rotary electric machine clutch Cm1 from being repeated by the power generated from the third rotary electric machine MG3 even when the braking device 58BK generates the braking force during the descending suppression control. As a result, in the embodiment, it is possible to suppress the vibration of the wheel loader 1 when the braking force is generated at the time of increasing the traction force of the wheel loader 1.

The embodiment may be applied to a different transmission device such as a hydro static transmission (HST). In this case, the first rotary electric machine MG1, the second rotary electric machine MG2, and the third rotary electric machine MG3 serve as a hydraulic motor and a hydraulic pump. The first rotary electric machine MG1, the second rotary electric machine MG2, and the third rotary electric machine MG3 are, for example, variable displacement hydraulic pump motors and the capacity is controlled by the control device 27.

The power transmission device 24 is not limited to the configuration of the embodiment. For example, the connection and the arrangement of the rotation components of the planetary gear mechanisms 68 and 69 are not limited to the connection and the arrangement of the embodiment. The number of the planetary gear mechanisms is not limited to two. For example, the power transmission device 24 may include one planetary gear mechanism. The power transmission device 24 may be a combination of a plurality of gears or chains instead of the planetary gear mechanism.

In the embodiment, the magnitude of the gain A is changed in response to the first rotation speed Nm1 of the first rotary electric machine MG1, but may be a constant value regardless of the first rotation speed Nm1. In the embodiment, the assistance control unit 90 corrects the target output shaft torque To_ref, but may correct the requested traction force Tout.

While the embodiment has been described above, the embodiment is not limited to the contents described above. Further, the above-described components include those easily supposed by those skilled in the art, having substantially the same configuration, and so-called equivalents. Furthermore, the above-described components can be appropriately combined. Furthermore, at least one of various omissions, substitutions, and modifications of components can be made without departing from the gist of the embodiment.

REFERENCE SIGNS LIST

1 WHEEL LOADER
5 WORKING EQUIPMENT
6R REAR WHEEL
6F FRONT WHEEL
21 INTERNAL-COMBUSTION ENGINE
24 POWER TRANSMISSION DEVICE
25 TRAVELING DEVICE
27 CONTROL DEVICE
45 AXLE
54 FORWARD/BACKWARD MOVEMENT OPERATION DEVICE
58 BRAKE OPERATION DEVICE
58BK BRAKING DEVICE
59 INCLINATION DETECTOR
68 FIRST PLANETARY GEAR MECHANISM
69 SECOND PLANETARY GEAR MECHANISM
81 TARGET INPUT SHAFT TORQUE DETERMINATION UNIT
82 TARGET OUTPUT SHAFT TORQUE DETERMINATION UNIT
83 ROTARY ELECTRIC MACHINE INSTRUCTION DETERMINATION UNIT
84 TRANSMISSION REQUEST DETERMINATION UNIT
90 ASSISTANCE CONTROL UNIT
91 DETERMINATION UNIT
92 FLAG GENERATION UNIT
93 SWITCHING UNIT
95 GAIN ADDITION UNIT
94, 96 ADDER/SUBTRACTOR
97 CLUTCH CONTROL UNIT
A GAIN
Cm1 FIRST ROTARY ELECTRIC MACHINE CLUTCH
Cm2 SECOND ROTARY ELECTRIC MACHINE CLUTCH
Fa3 ASSISTANCE FLAG
MG1 FIRST ROTARY ELECTRIC MACHINE
MG2 SECOND ROTARY ELECTRIC MACHINE
MG3 THIRD ROTARY ELECTRIC MACHINE
Nm1 FIRST ROTATION SPEED
Nm1c SPEED THRESHOLD VALUE
Nm1t TARGET ROTATION SPEED
Pb BRAKING PRESSURE
Pbc BRAKING PRESSURE THRESHOLD VALUE
Rs ROTATION SPEED RATIO
Sdd TRAVELING DIRECTION INSTRUCTION VALUE
Tad TORQUE INCREASE AMOUNT
To_ref TARGET OUTPUT SHAFT TORQUE
To_ref' CORRECTION TARGET OUTPUT SHAFT TORQUE
Vac CONTROL EXECUTION INSTRUCTION
Vnj VEHICLE SPEED DETERMINATION VALUE
Vrj INCLINATION DETERMINATION VALUE

The invention claimed is:

1. A hybrid work vehicle comprising:
a traveling device which drives a vehicle wheel so that a vehicle body travels; and
a control device which controls the traveling device,
wherein the traveling device includes
a first rotary electric machine,
a second rotary electric machine,
an internal-combustion engine,
a power transmission device which transmits power output from the internal-combustion engine to the vehicle wheel through at least the first rotary electric machine and the second rotary electric machine,
a third rotary electric machine which applies power to at least one of the first rotary electric machine and the second rotary electric machine, and
a braking device which brakes the vehicle wheel, and
wherein the control device executes a first control of applying the power of the third rotary electric machine to at least one of the first rotary electric machine and the second rotary electric machine and a second control of canceling the first control when a vehicle speed of the traveling device becomes or exceeds a speed threshold value and continuously applies the power from the third rotary electric machine when a braking force of the braking device is larger than a braking force threshold value during the second control.

2. The hybrid work vehicle according to claim 1, wherein the control device applies the power of the third rotary electric machine to the first rotary electric machine when it is determined that the hybrid work vehicle is located on an inclined surface.

3. The hybrid work vehicle according to claim 1, wherein the control device executes the first control when an instruction value for determining a forward or backward movement of the traveling device is different from an actual traveling direction of the traveling device.

4. The hybrid work vehicle according to claim 1, wherein the control device stops the applying of the power from the third rotary electric machine when the braking force of the braking device becomes equal to or smaller than the braking force threshold value.

5. The hybrid work vehicle according to claim 1, wherein the power transmission device includes
a planetary gear mechanism,
a first power connection/disconnection mechanism which is disposed between the third rotary electric machine and the first rotary electric machine, and
a second power connection/disconnection mechanism which is disposed between the third rotary electric machine and the second rotary electric machine,
the internal-combustion engine exchanges power with a first component of the planetary gear mechanism,
the first rotary electric machine exchanges power with a second component of the planetary gear mechanism, and
the second rotary electric machine exchanges power with a third component of the planetary gear mechanism.

6. The hybrid work vehicle according to claim 1, wherein the hybrid work vehicle is a wheel loader.

7. A hybrid work vehicle control method of controlling a hybrid work vehicle including an internal-combustion engine and a power transmission device which includes a third rotary electric machine applying power to at least one of a first rotary electric machine and a second rotary electric machine and outputs the power output from the internal-combustion engine to a traveling device through at least the first rotary electric machine and the second rotary electric machine, the hybrid work vehicle control method comprising:
- executing a first control of applying the power of the third rotary electric machine to at least one of the first rotary electric machine and the second rotary electric machine and a second control of canceling the first control when a vehicle speed of the hybrid work vehicle becomes or exceeds a speed threshold value; and
- continuously applying the power from the third rotary electric machine during the second control based on braking information representing a braking state of the hybrid work vehicle.

* * * * *